(12) United States Patent
Xie et al.

(10) Patent No.: US 9,326,093 B2
(45) Date of Patent: Apr. 26, 2016

(54) VIRTUAL BLUETOOTH CONTROLLER INTERFACES

(71) Applicant: Google Inc., Mountain View, CA (US)

(72) Inventors: Wei Xie, Palo Alto, CA (US); Prem Kumar, Saratoga, CA (US); Wei Wang, San Carlos, CA (US)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 14/304,091

(22) Filed: Jun. 13, 2014

(65) Prior Publication Data

US 2015/0365780 A1 Dec. 17, 2015

(51) Int. Cl.
*H04B 7/00* (2006.01)
*H04W 4/00* (2009.01)
*H04M 1/725* (2006.01)
*H04W 76/02* (2009.01)

(52) U.S. Cl.
CPC ............ *H04W 4/008* (2013.01); *H04M 1/7253* (2013.01); *H04W 76/023* (2013.01)

(58) Field of Classification Search
CPC ... H04W 4/008; H04W 76/023; H04W 4/005; H04W 48/16; H04M 1/7253
USPC ...................................................... 455/41.2
See application file for complete search history.

(56) References Cited

U.S. PATENT DOCUMENTS

| | | | | |
|---|---|---|---|---|
| 6,842,460 B1 * | 1/2005 | Olkkonen | ............. | H04W 48/16 370/328 |
| 8,447,910 B1 | 5/2013 | Yi et al. | | |
| 8,620,379 B2 * | 12/2013 | Zhodzishsky | ........... | H04L 69/32 370/252 |
| 2002/0174073 A1 * | 11/2002 | Nordman | ............. | G06Q 20/382 705/64 |
| 2003/0006911 A1 * | 1/2003 | Smith | ..................... | G06Q 30/02 340/988 |
| 2003/0228842 A1 * | 12/2003 | Heinonen | ............. | H04L 63/083 455/41.2 |
| 2008/0189360 A1 * | 8/2008 | Kiley | ................ | G06F 17/30867 709/203 |
| 2008/0255943 A1 * | 10/2008 | Morten | .................. | G06Q 30/02 705/14.53 |
| 2009/0094317 A1 * | 4/2009 | Venkitaraman | ... | H04L 29/12311 709/203 |

(Continued)

FOREIGN PATENT DOCUMENTS

EP 2461247 A1 6/2012

OTHER PUBLICATIONS

Qadeer, Mohammed A., Bluetooth Enabled Mobile Phone Remote Control for PC, IEEE Xplore, Mar. 23, 2009, 747-751.

(Continued)

*Primary Examiner* — Marceau Milord
(74) *Attorney, Agent, or Firm* — McDonnell Boehnen Hulbert & Berghoff LLP

(57) ABSTRACT

Example embodiments herein disclose methods, Bluetooth devices, and computer-readable media a capable of providing virtual Bluetooth controller (VBC) interfaces for a number of applications. In particular, an example method includes determining a number of applications configured to communicate with a Bluetooth device. Further, the method includes determining a number of virtual Bluetooth controller (VBC) interfaces for the number of applications, where the number of VBC interfaces correspond to respective Bluetooth static random (BSR) addresses of a number of BSR addresses. Yet further, the method includes determining one or more advertising packets for the number of VBC interfaces, where the one or more advertising packets include the respective BSR addresses of the number of BSR addresses. In addition, the method includes transmitting, via a radio of the Bluetooth device, the one or more advertising packets for the number of VBC interfaces.

17 Claims, 10 Drawing Sheets

(56) References Cited

U.S. PATENT DOCUMENTS

| | | | |
|---|---|---|---|
| 2011/0081860 A1* | 4/2011 | Brown | H04N 1/00347 455/41.3 |
| 2012/0196534 A1* | 8/2012 | Kasslin | H04W 76/002 455/41.2 |
| 2013/0006866 A1* | 1/2013 | Pendakur | G06Q 30/0241 705/50 |
| 2013/0040574 A1* | 2/2013 | Hillyard | H04W 8/005 455/41.2 |
| 2013/0165044 A1* | 6/2013 | Xie | H04W 52/0229 455/41.2 |
| 2014/0194062 A1* | 7/2014 | Palin | H04W 4/008 455/41.2 |
| 2014/0373123 A1* | 12/2014 | Kang | H04L 41/22 726/7 |
| 2015/0289124 A1* | 10/2015 | Palin | H04W 8/005 455/41.2 |

OTHER PUBLICATIONS

Manikandan, G., Traffic Control by Bluetooth Enabled Mobile Phone, International Journal of Computer and Communication Engineering, May 2012, 66-69, vol. 1, No. 1.

* cited by examiner

| VBC 662 | BSR ADDRESSES 664 | ADVERTISING 666 | PARAMETER 668 | TX POWER 670 |
| --- | --- | --- | --- | --- |
| VBC 634 | BSR ADDRESS 634A | ADVERTISING 678 | PARAMETER 684 | TX POWER 690 |
| VBC 636 | BSR ADDRESS 636A | ADVERTISING 680 | PARAMETER 686 | TX POWER 692 |
| VBC 638 | BSR ADDRESS 638A | ADVERTISING 682 | PARAMETER 688 | TX POWER 694 |

FIG. 6B

VIRTUAL BLUETOOTH CONTROLLER INTERFACES

BACKGROUND

Unless otherwise indicated herein, the materials described in this section are not prior art to the claims in this application and are not admitted to be prior art by inclusion in this section.

Portable computing devices such as personal computers, laptop computers, tablet computers, smart phones, wearable computers, and countless types of Internet-capable devices are prevalent in numerous aspects of modern life. For example, it is common for a single consumer to operate a smartphone, a laptop computer, a keyboard, and a mouse, possibly simultaneously. With an increasing number of consumers operating multiple portable devices, the demand for wireless technology continues to play a role in the use of such portable devices. As such, various forms of wireless technology have evolved to locally connect these portable devices for numerous applications. One wireless technology standard for exchanging data between multiple portable devices is popularly known as Bluetooth.

Bluetooth is commonly used to wirelessly connect a portable device with one or more other portable devices over a short range. For example, Bluetooth may be used to connect a cell phone to a wireless headset, possibly allowing for hands-free use of the phone. In some instances, Bluetooth may also be used to connect the cell phone to the audio speakers and a microphone of a motor vehicle, possibly allowing for hands-free use of the phone while operating the vehicle. Thus, numerous applications have allowed Bluetooth to grow as the standard wire-replacement protocol. In multiple applications, Bluetooth remains particularly attractive due to its low-cost solutions and protocols designed for low power consumption.

SUMMARY

Example embodiments herein disclose methods, computing devices, and computer-readable media capable of creating virtual Bluetooth controller (VBC) interfaces for a number of applications of a Bluetooth device. For example, by creating a VBC interface for each application, an advertising packet may be transmitted for each application of the Bluetooth device in accordance with Bluetooth protocols. As such, multiple advertising packets may be transmitted by the applications to pair the Bluetooth device with multiple other computing devices.

In one example, a method is provided. The method includes determining a number of applications configured to communicate with a Bluetooth device. Further, the method includes determining a number of virtual Bluetooth controller (VBC) interfaces for the number of applications, where the number of VBC interfaces correspond to respective Bluetooth static random (BSR) addresses of a number of BSR addresses. Yet further, the method includes determining one or more advertising packets for the number of VBC interfaces, where the one or more advertising packets include the respective BSR addresses of the number of BSR addresses. In addition, the method includes transmitting, via a radio of the Bluetooth device, the one or more advertising packets for the number of VBC interfaces.

In another example, a Bluetooth device is provided. The Bluetooth device may include a processor and a computer readable medium having stored thereon program instructions that, when executed by the processor, cause the Bluetooth device to perform functions. The functions include determining a number of applications configured to communicate with the Bluetooth device. Yet further, the functions include determining a number of virtual Bluetooth controller (VBC) interfaces for the number of applications, where the number of VBC interfaces correspond to respective Bluetooth static random (BSR) addresses of a number of BSR addresses. In addition, the functions include determining one or more advertising packets for the number of VBC interfaces, where the one or more advertising packets include the respective BSR addresses of the number of BSR addresses. Further, the functions include transmitting, via a radio associated with the Bluetooth device, the one or more advertising packets for the number of VBC interfaces.

In still another example, a computer-readable medium is provided. The computer-readable medium has stored thereon program instructions that, when executed by a processor of a Bluetooth device, cause the Bluetooth device to perform functions. The functions include determining a number of applications configured to communicate with the Bluetooth device. Yet further, the functions include determining a number of virtual Bluetooth controller (VBC) interfaces for the number of applications, where the number of VBC interfaces correspond to respective Bluetooth static random (BSR) addresses of a number of BSR addresses. In addition, the functions include determining one or more advertising packets for the number of VBC interfaces, where the one or more advertising packets include the respective BSR addresses of the number of BSR addresses. Further, the functions include transmitting, via a radio associated with the Bluetooth device, the one or more advertising packets for the number of VBC interfaces.

In still another example, a system is provided. The system may include means for determining a number of applications configured to communicate with a Bluetooth device. Further, the system may include means for determining a number of virtual Bluetooth controller (VBC) interfaces for the number of applications, where the number of VBC interfaces correspond to respective Bluetooth static random (BSR) addresses of a number of BSR addresses. Yet further, the system may include means for determining one or more advertising packets for the number of VBC interfaces, where the one or more advertising packets include the respective BSR addresses of the number of BSR addresses. In addition, the system may include means for transmitting, via a radio associated with the Bluetooth device, the one or more advertising packets for the number of VBC interfaces.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 6B illustrates an example data table of VBC interfaces.

DETAILED DESCRIPTION

Figure 1:
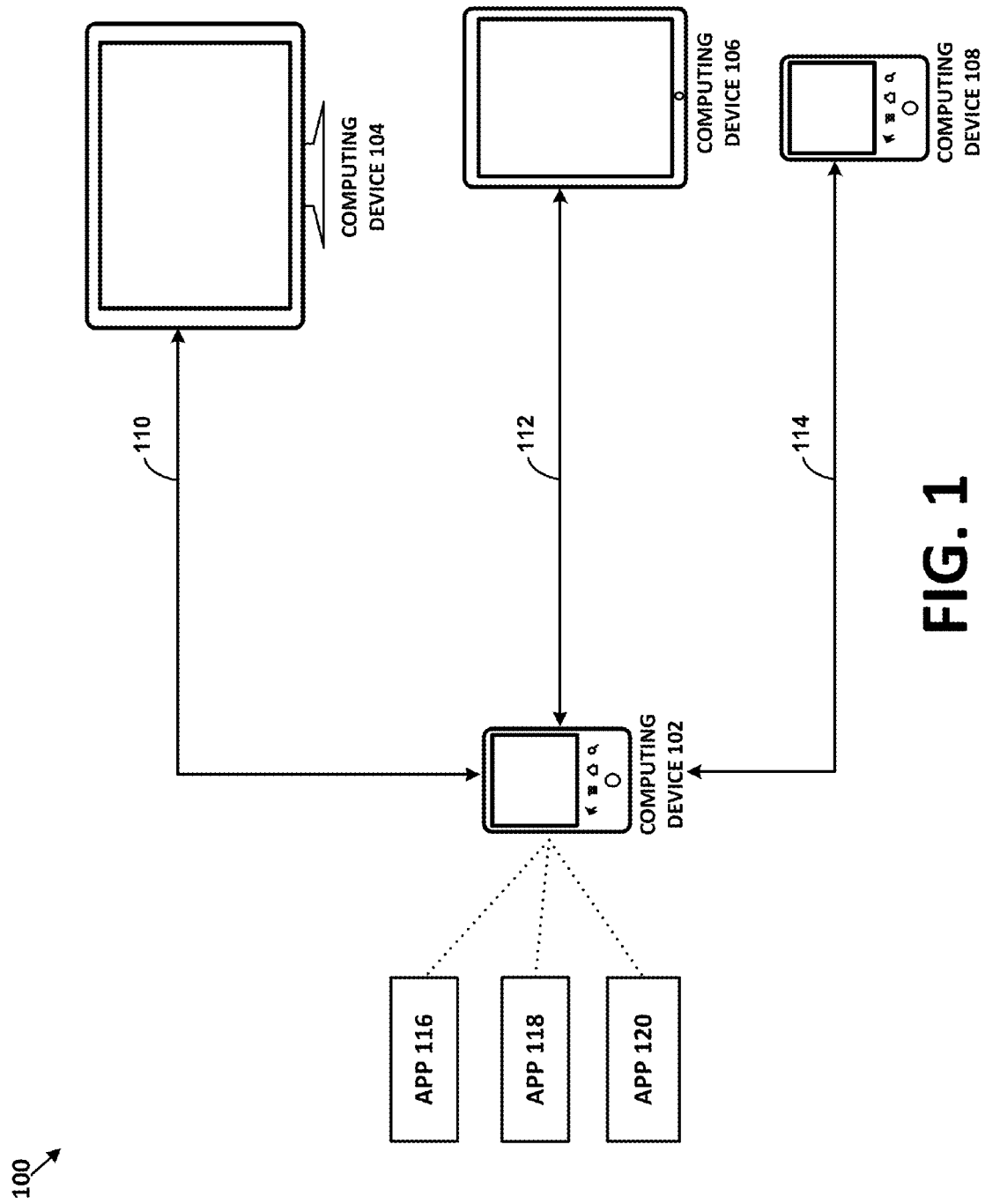
FIG. 1 illustrates an example computing device.

The following detailed description describes various features and functions of the disclosed methods, computing devices, and systems with reference to the accompanying figures. In the figures, similar symbols identify similar components, unless context dictates otherwise. The illustrative methods, computing devices, and systems embodiments described herein are not meant to be limiting. It may be readily understood that certain aspects of the disclosed methods, computing devices, and systems can be arranged and combined in a wide variety of different configurations, all of which are contemplated herein.

I. Overview

As noted, Bluetooth continues to grow as a wire-replacement protocol and remains particularly attractive due to its protocols designed for low power consumption. In particular, Bluetooth Low Energy (BLE) provides protocols for low power devices to communicate with multiple other computing devices. For example, consider a smartwatch that can be powered by one or more coin cell batteries. Further, consider that the smartwatch utilizes BLE's protocols for communicating with other computing devices such as a wireless headset. For example, a music-playing application on the smartwatch may stream music to the wireless headset. In particular, BLE's protocols may include a BLE advertising protocol (possibly referred to herein as an "advertising protocol"). As such, the smartwatch may "advertise" or announce its presence to other computing devices such as the wireless headset. Further, the smartwatch may "pair" or connect with the wireless headset for streaming music to the wireless headset. As such, advertising protocols may be designed to allow the smartwatch to pair with the wireless headset, while maintaining the smartwatch's low power consumption.

There are several other advantages to BLE's advertising protocols. For example, considering the scenario above, the smartwatch may pair with the wireless headset faster using advertising protocols than by using other protocols. In particular, advertising protocols may be fixed to three channels of the 802.11 frequency range, e.g., the 2.4 GHz frequency range. Thus, without scanning the entire 2.4 GHz frequency range, the wireless headset may receive advertising packets from the smartwatch over the three fixed channels. In particular, the wireless headset may receive BLE advertising packets faster.

Yet, one of the challenges of using advertising protocols is related to possible limitations of the advertising packets. For example, consider another scenario in which the smartwatch has both a music-playing application and a keyboard application. The keyboard application may allow a user to type words into a wireless keyboard such that the typed words may appear on the display of the smartwatch, possibly for typing notes. In such instances, the smartwatch may attempt to send a single advertising packet to both the wireless headset and a wireless keyboard, possibly for advertising the music-playing application and the keyboard application, respectively. Yet, the advertising packet may have a data limitation of 31 bytes and therefor, the packet may have limited space for data in the advertising packet. As such, the packet may be limited to advertising for just one application, either the music-playing application or the keyboard application.

Another challenge may be related to the smartwatch having a single Bluetooth controller with a single Bluetooth static random (BSR) address for sending advertising packets. For example, considering the scenario above, the smartwatch may send a first advertising packet to advertise for the music-playing application and a second advertising packet to advertise for the keyboard application. Since the single controller of the smartwatch may be limited to a single BSR address, the smartwatch may encounter additional difficulties when attempting to pair the smartwatch to both the wireless headset and the wireless keyboard.

In particular, once the wireless headset receives the first advertising packet, the smartwatch may begin the pairing process with the wireless headset using the single BSR address. Further, once the portable keyboard receives the second advertising packet, the smartwatch may begin the pairing process with the wireless keyboard also using the single BSR address. Thus, since the smartwatch may attempt to pair with both the wireless headset and the wireless keyboard using the same BSR address, the smartwatch may encounter difficulties in differentiating the data from the wireless headset and the data from the wireless keyboard.

Example embodiments herein disclose methods for creating virtual Bluetooth controller (VBC) interfaces for a number of applications of a Bluetooth device. For example, by creating a VBC interface for each application, an advertising packet may be transmitted for each application of the Bluetooth device. As such, multiple advertising packets may be transmitted by the applications to pair the Bluetooth device with multiple other computing devices. For example, a single advertising device, e.g., the smartwatch, may send multiple advertising packets for a number of applications, e.g., the music-playing application and the keyboard application.

Further, each of the VBC interfaces may enable the smartwatch to send advertising packets, where each advertisement packet may be assigned a unique BSR address. Thus, the listening devices, e.g., the wireless headset and the portable keyboard, may perceive each advertising packet as being sent from a different advertising device. As such, the smartwatch may advertise and pair with multiple listening devices. Thus, the smartwatch may enable both the music-playing application for streaming music, the keyboard application for typing information into the smartwatch, as well as other applications on the smartwatch in additional contexts.

II. Introduction

FIG. 1 illustrates an example computing device. As shown in scenario 100 of FIG. 1, computing device 102 may be a smart phone, computing device 104 may be a digital television or a monitor, computing device 106 may be a tablet computer, and computing device 108 may be another smart phone. Yet, it should be understood that arrangements for computing devices 102 through 108 are provided in FIG. 1 for purposes of illustration only. For example, computing device 102 may also be the smartwatch as described in the scenarios above, among other types of wearable computing devices. In addition, in some instances, computing devices 102 may be a laptop computer, a tablet computer, and/or a human-interface device, among other possibilities. As such, the computing device 102 may, for example, take the form of any of the computing devices described above in relation to determining virtual Bluetooth controller (VBC) interfaces for a number of applications.

Further, as shown in FIG. 1, computing device 102 may pair or connect with a number of other computing devices. For example, computing device 102 may pair or connect to computing device 104 through connection 110. Further, computing device 102 may also pair or connect with computing device 106 through connection 112. Yet further, computing 102 may also pair or connect with computing device 108 through connection 114. In addition, connections 110, 112, and 114 may be point-to-point wireless connections such as BLUETOOTH® connections and/or Bluetooth Low Power Energy (LPE) connections, among other types of connections.

In some instances, computing device 102 may determine a number of applications. For example, applications 116, 118, and 120 may, for example, be downloaded on computing device 102. In some instances, application 116 may be a video-playing application for streaming videos from computing device 102 to computing device 104, possibly for displaying the videos on a larger display of computing device 104. Further, application 118 may be a presentation application, a word application, and/or a spreadsheet application for sending information from computing device 102 to computing device 106, possibly for modifying the information using the graphical user interface (GUI) of computing device 106 and/or the pointing device illustrated with computing device 106. Yet further, application 120 may be a smart phone application for transmitting phone data between computing device 102 and computing device 108.

Figure 2:
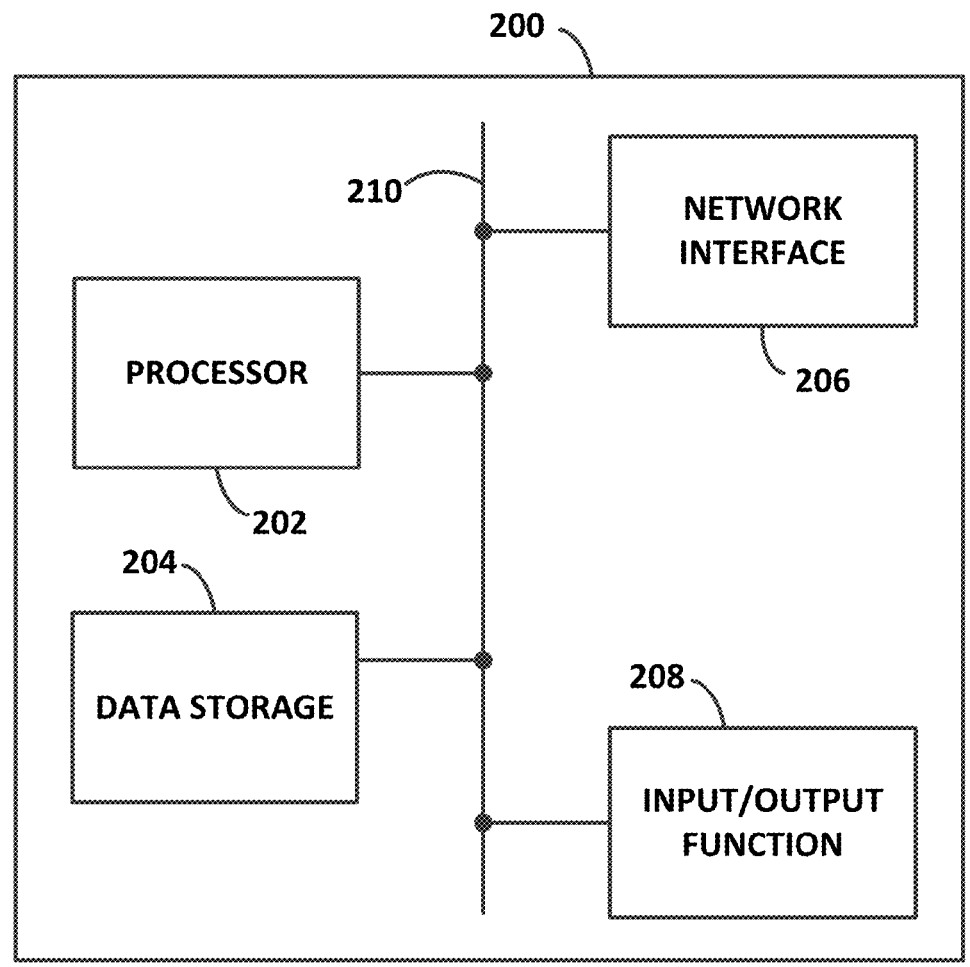
FIG. 2 illustrates a schematic drawing of an example computing device.

FIG. 2 illustrates a schematic drawing of an example computing device. In some instances, computing device 200 may, for example, take the form of any computing devices, e.g., Bluetooth devices, described above in relation to FIG. 1. Further, computing device 200 may be configured to perform the methods and functions described herein. In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits, digital signal processors, network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or functions disclosed in this specification or the accompanying drawings.

Network interface 206 may take the form of a wireless connection, such as BLUETOOTH®. In particular, network interface 206 may enable one or more Bluetooth standards or protocols, including BLE protocols and related advertising protocols. Further, network interface 206 may include a radio for transmitting advertising packets to other computing devices. For example, referring back to FIG. 1, computing device 102 may also include a network interface, such as network interface 206, to pair with computing devices 104, 106, and 108. In addition, network interface 206 may take the form of other wireless connections such as IEEE 802.11 (Wi-Fi), or a wide-area wireless connection. Further, other forms of physical layer connections and other types of standard or proprietary communication protocols may be used over network interface 206. Yet further, network interface 206 may comprise multiple physical interfaces. Further, network interface 206 may take the form of a wireline connection, such as an Ethernet connection.

Input/output function 208 may facilitate user interaction with computing device 200. Input/output function 208 may comprise multiple types of input devices, such as a keyboard, a mouse, a touch screen, and so on. Similarly, input/output function 208 may comprise of multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, the computing device 200 may include a device platform or operating system (not shown). In some instances, the device platform and/or the operating system may be compatible with Bluetooth protocols, Bluetooth Low Energy (BLE) protocols, and/or BLE advertising protocols. In some instances, the device platform and/or the operating system may be configured as a multi-layered Linux platform or operating system. The device platform may include different applications and an application framework, as well as various kernels, libraries, and runtime entities. In other examples, other formats or systems may operate the computing device 200 as well.

In some embodiments, one or more computing devices may be deployed in a networked architecture, possibly as illustrated in FIG. 1. The exact physical location, connectivity, and configuration of the computing devices may be unknown and/or unimportant to other computing devices. Accordingly, the computing devices in FIGS. 1 and 2 may be referred to as "cloud-based" devices that may be housed at various remote locations.

Figure 3:
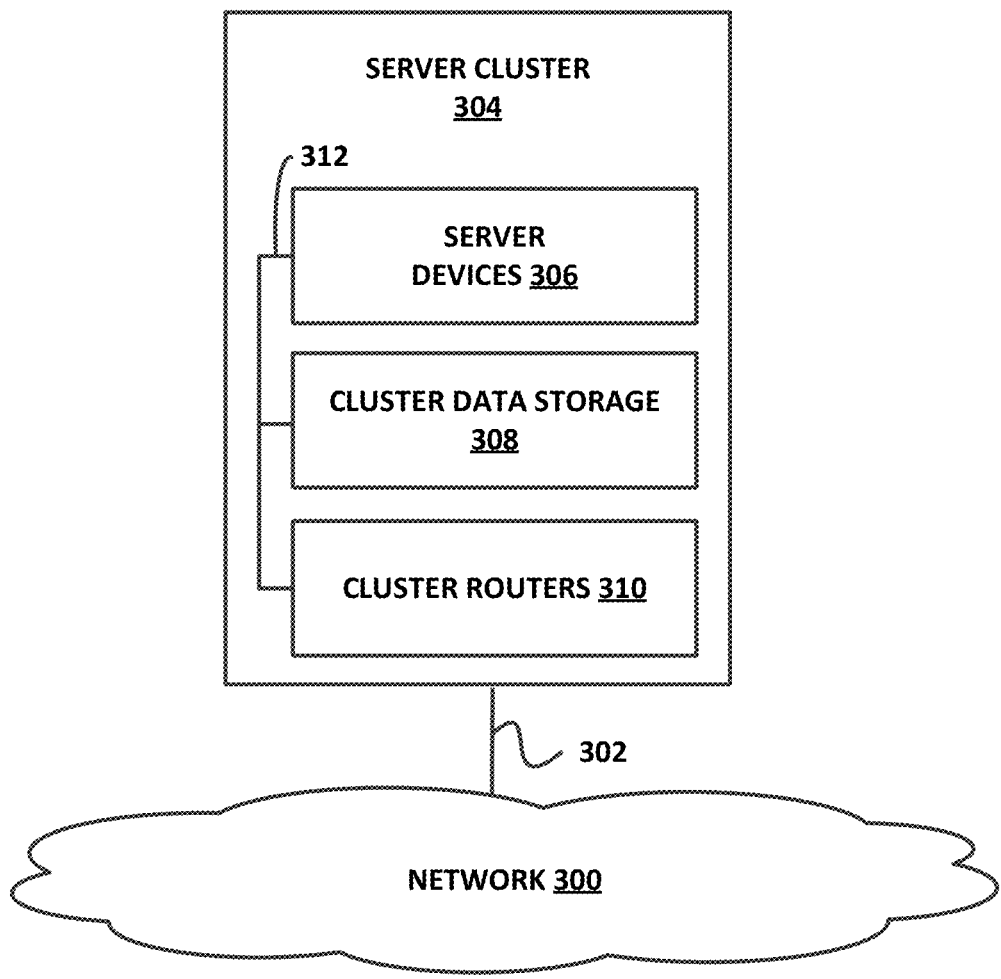
FIG. 3 illustrates a schematic drawing of an example networked server cluster.

FIG. 3 illustrates a schematic drawing of an example networked server cluster. In particular, server devices 306 may, for example, take the form of any computing devices, e.g., Bluetooth devices, described above in relation to FIGS. 1 and 2. In FIG. 3, functions of computing device 200 may be distributed between server devices 306, cluster data storage 308, and cluster routers 310, all of which may be connected by local cluster network 312. The number of server devices 306, cluster data storages 308, and cluster routers 310 in server cluster 304 may depend on the computing task(s) and/or applications assigned to server cluster 304.

For example, server devices 306 may be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

Figure 4A:
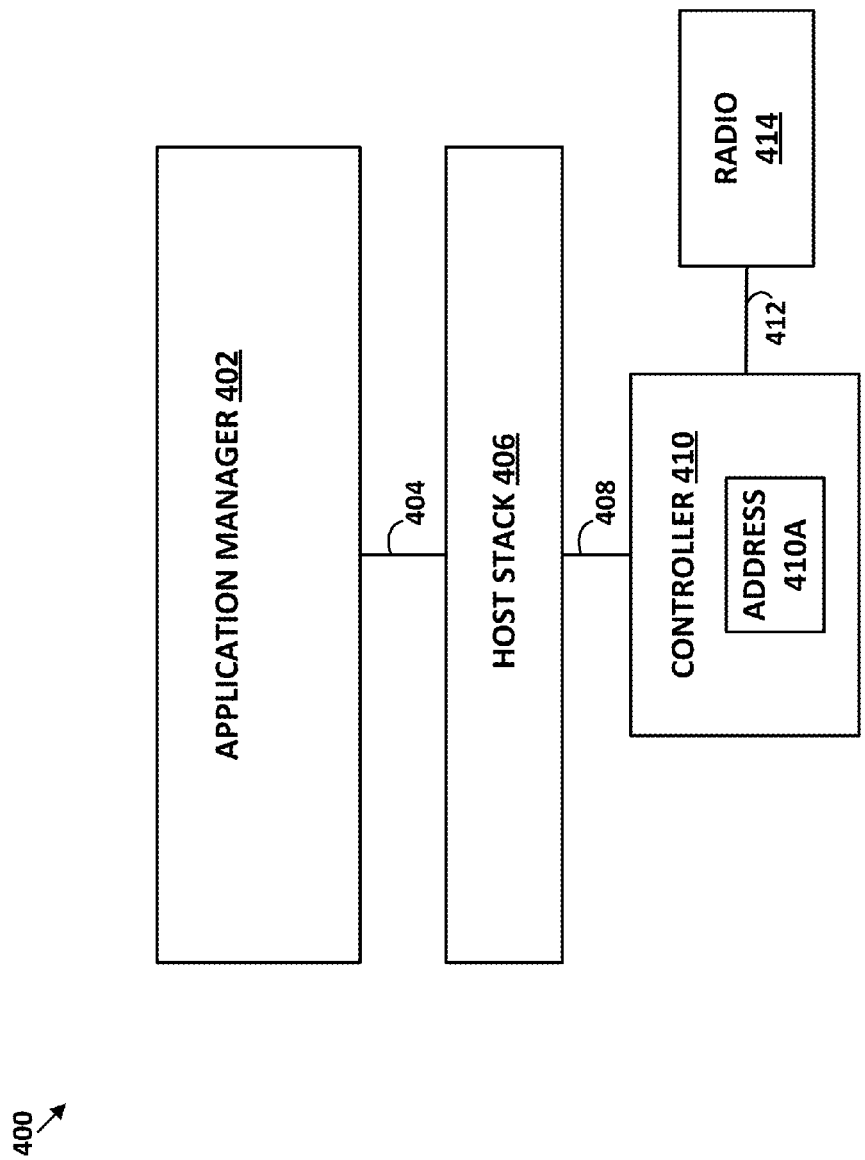
FIG. 4A illustrates a schematic drawing of example Bluetooth device.

FIG. 4A illustrates a schematic drawing of an example Bluetooth device. In particular, Bluetooth device 400 may, for example, be combined with any of the computing devices, e.g., Bluetooth devices, described in the scenarios above. In some instances, Bluetooth device 400 may be incorporated into any of the computing devices described above, possibly as a Bluetooth module among other modules in a respective computing device. For example, as in the scenarios above, Bluetooth device 400 may be incorporated into the smartwatch for sending advertising packets to the wireless headset and the portable keyboard.

In this example, Bluetooth device 400 includes application manager 402, host stack 406, controller 410, and radio 414. In particular, application manager 402 may be coupled to host stack 406 by system bus 404 or a similar mechanism. Further, host stack 406 may be coupled to controller 410 by system bus 408 or a similar mechanism. Yet further, controller 410 may be coupled to radio by system bus 412 or similar mechanism.

Controller 410 may include a physical Bluetooth controller interface. Further, the physical Bluetooth controller interface may correspond to physical Bluetooth static random (BSR) address 410A, possibly for transmitting an advertising packet for an application downloaded on the Bluetooth device 400. For example, referring back to the scenarios above, consider that Bluetooth device 400 is incorporated with the smartwatch. As such, the music-playing application may be downloaded to Bluetooth device 400. Further, controller 410 may correspond to BSR address 410A for transmitting an advertising packet for the music-playing application.

In some embodiments, BSR address 410A may be 48-bit randomly generated addresses. For example, BSR address 410A may meet a number of requirements. For example, the two most significant bits of the BSR address may be equal to '1'. Further, bits of the random part of the BSR address may or may not be equal to '1'. In addition, bits of the random part of the BSR address may or may not be equal to '0'.

Bluetooth device 400 may operate in different modes depending on the functionality. In some instances, the functionality of Bluetooth device 400 may be controlled by a user of Bluetooth device 400. Considering the scenarios above, the user may provide an input to computing device 200, possibly the smartwatch that may be combined with Bluetooth device 400. In particular, the user may provide an input to input/output function 208, possibly a graphical user-interface (GUI), to initiate the music-playing application and stream music to a wireless headset. As such, the operating modes of Bluetooth 400 may include an advertising mode among other possible modes.

In some embodiments, the advertising mode involves Bluetooth device 400 transmitting advertising packets. In some instances, such advertising packets may be received by one or more listening devices. Further, such listening devices may receive the advertising packets and request more information from Bluetooth device 400. As such, Bluetooth device 400 may respond with more information upon such requests from these listening devices. In addition, Bluetooth 400 may have other modes such as a scanning mode, a master device mode, and a slave device mode. In some embodiments, the scanner mode involves other devices listening for advertising packets transmitted by other devices.

In some embodiments, the Bluetooth device 400 may be in advertisement mode to establish a connection with another computing device. For example, referring again to the scenarios above, consider that Bluetooth device 400 is combined with the smartwatch. As such, the wireless headset may scan for advertising packets sent by Bluetooth device 400. Upon receiving the advertising packet, the wireless headset may send a pairing request to Bluetooth device 400. Once a connection is established for pairing the wireless headset with Bluetooth device 400, the wireless headset may become the slave device and the Bluetooth device 400 may become the master device.

Figure 4B:
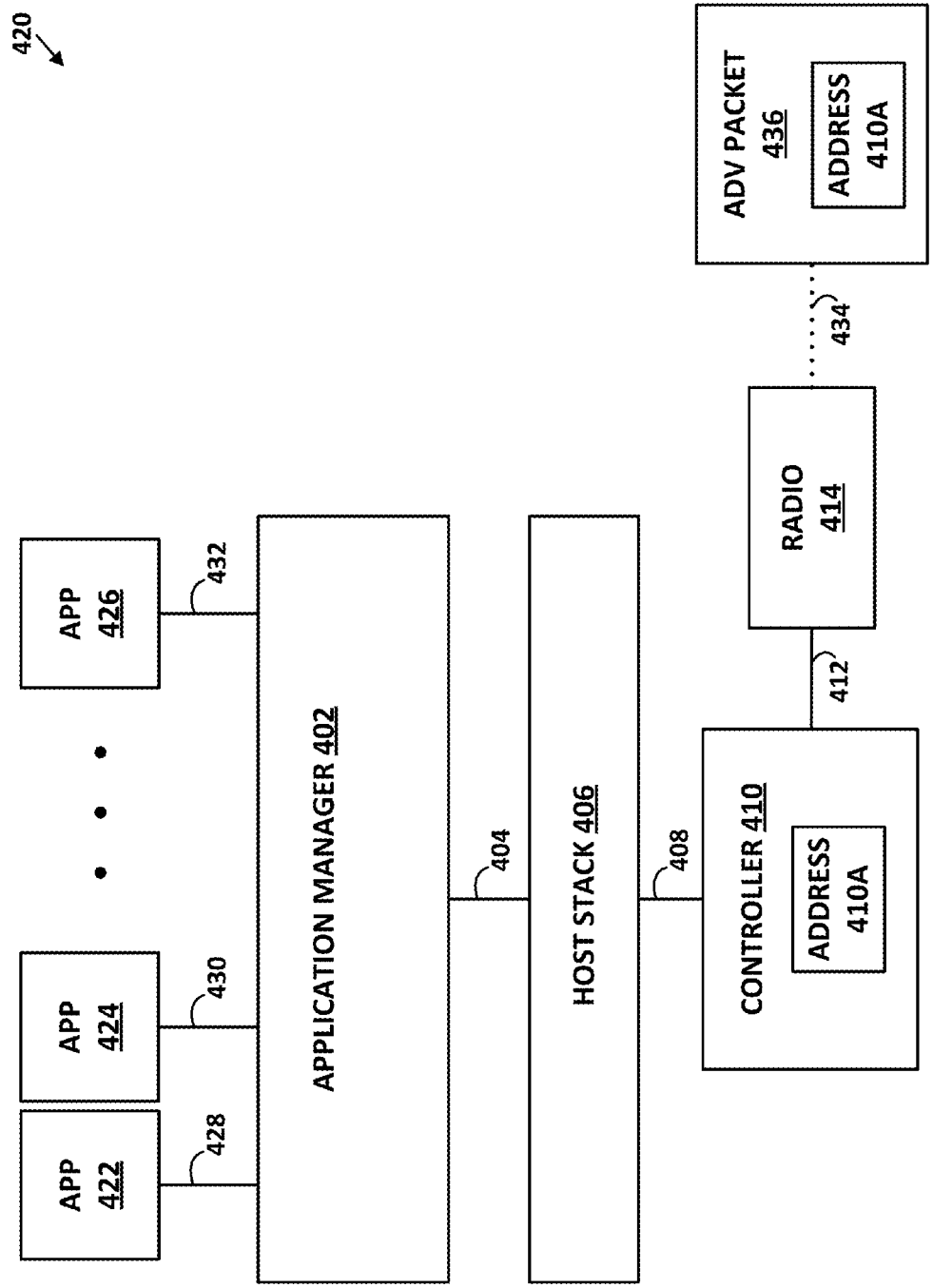
FIG. 4B illustrates a schematic drawing of another example Bluetooth device.

FIG. 4B illustrates a schematic drawing of another example Bluetooth device. In particular, Bluetooth device 420 may, for example, take the form of any of the computing devices, e.g., Bluetooth devices, described above in relation to FIGS. 1 through 4A. For example, in relation to FIG. 4A, Bluetooth device 420 of FIG. 4B also includes application manager 402, host stack 406, controller 410, and radio 414. Further, application manager 402 may be coupled to host stack 406 by system bus 404 or a similar mechanism. Further, host stack 406 may be coupled to controller 410 by system bus 408 or a similar mechanism. Yet further, controller 410 may be coupled to radio by system bus 412 or similar mechanism.

Applications 422, 424, and 426 may be downloaded on Bluetooth device 420 and/or on a computing device combined with Bluetooth device 420. In some instances, applications 422, 424, and 426 may, for example, take the form of any applications described above, possibly in relation to FIGS. 1 through 4A. For example, applications 422, 424, and 426 may take the forms of applications 116, 118, and 120, respectively, as described above in relation to FIG. 1. Further, applications 422, 424, and 426 may exchange advertisement data with application manager 402 through application interfaces 428, 430, and 432, respectively. Further, additional applications may attempt to exchange advertisement data with application manager 402, as illustrated by the ellipses between applications 424 and 426. Yet further, applications 422, 424, and 426 may communicate with application manager 402 to exchange advertising packets with other devices (not shown in FIG. 4).

In some embodiments, Bluetooth device 420 may enter advertisement mode to transmit one or more advertising packets over the air for applications 422, 424, and 426. As noted in relation to FIG. 4A, controller 410 of FIG. 4B may be assigned a single Bluetooth static address 410A for transmitting advertising packets to other computing devices. For example, Bluetooth device 420 may create advertising packet 436 that includes BSR address 410A. As such, advertising packet 436 may be transmitted by radio 414, possibly for a number of applications 422, 424, and 426. For example, consider that application 422 is a music-playing application. In such instances, advertisement packet 436 may be transmitted to a wireless headset for pairing Bluetooth device 420 with the wireless headset. As such, music data from application 422 may be streamed to the wireless headset.

Figure 4C:
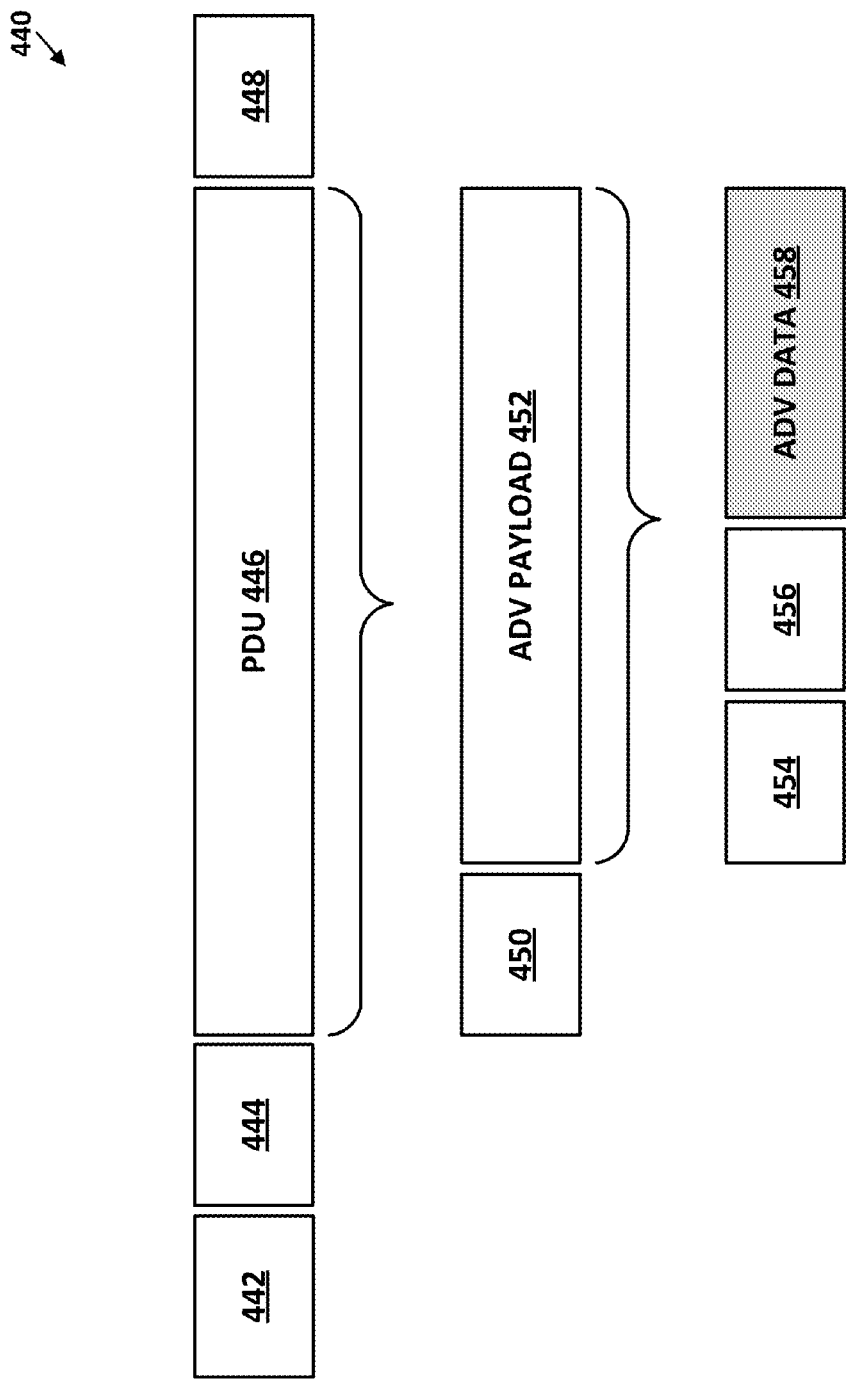
FIG. 4C illustrates an example advertising packet.

FIG. 4C illustrates an example advertising packet. In particular, advertising packet 440 may, for example, take the form of any advertising packets described above in relation to the FIGS. 1 through 4B. As shown in FIG. 4C, advertising packet 440 may include preamble 442, access address 444, payload data unit (PDU) 446 with approximately 2 to 39 bytes, and cyclic redundancy check (CRC) 448.

In addition, PDU 446 may include header 450 and advertisement payload 452 with approximately 6 to 37 bytes. Further, advertisement payload 452 may include header 454, MAC address 456, and advertising data 458 with approximately up to 31 bytes. As noted in the scenarios above, this 31 byte space may limit the quantity or amount of advertisement data that may be transmitted for applications 422, 424, and 426. For example, in some instances, computing device 420 may transmit a single advertising packet 436 for possibly one or two of applications 422, 424, and 426, possibly due to the 31 byte limitation. In particular, the 31 byte space may provide enough space for the advertising data of applications 422 and 424, but possibly not application 426. Yet, in some instances, additional applications may be present as illustrated by the ellipses between applications 424 and 426 in FIG. 4B. As such, additional applications may encounter delays to transmit advertisement data due to the 31 byte space limitation.

In some instances, the single BSR address 410A of Bluetooth device 420 may also limit the advertisement data that may be transmitted for applications 422, 424, and 426. For example, consider that application 422 may be a music-playing application. As such, Bluetooth device 420 may send advertising packet 436 with the BSR address 410A, possibly to pair with a wireless headset and stream music to the wireless headset. Yet, Bluetooth device 420 may send a second advertising packet (not shown in FIGS. 4B and 4C) with the same BSR address 410A to pair with a wireless keyboard. As such, since the same BSR address 410A may be used in both pairing processes with the wireless headset and the wireless keyboard, the Bluetooth device 420 may be unable to differentiate data between the two pairing processes.

Further, for example, the wireless headset may receive both the first and second advertising packets, possibly disrupting a pairing process for the wireless headset. In particular, the wireless headset may receive the first and second advertisement packets such that each packet corresponds to the same BSR address 410A. As such, in some instances, the wireless headset may begin pairing with Bluetooth device 420 in response to the first advertisement. Further, the wireless headset may receive the second advertisement packet that may disrupt the pairing process initiated by the first advertisement packet.

III. Example Methods, Computing Devices, and Systems

Figure 5:
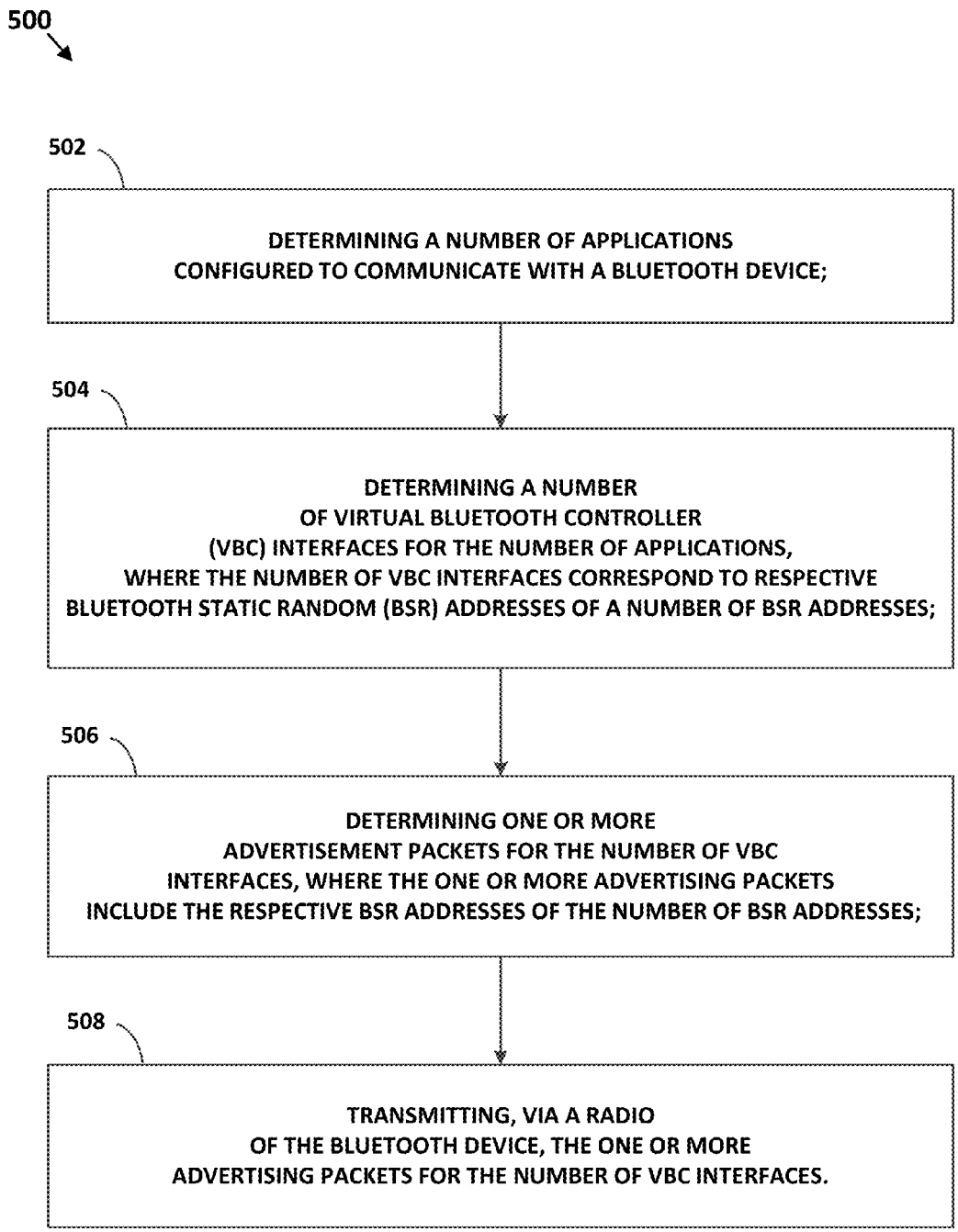
FIG. 5 illustrates a flow diagram of an example method for determining a number of Virtual Bluetooth Controller (VBC) interfaces.

FIG. 5 illustrates a flow diagram of an example method for determining a number of Virtual Bluetooth Controller (VBC) interfaces. In particular, method 500 of FIG. 5 may be carried out or implemented by one or more of the computing devices described above in relation to FIGS. 1 through 4C. For example, method 500 may be carried out by computing device 102 in FIG. 1 to send advertising packets to possibly pair with computing devices 104, 106, and 108. Further, methods 500 may include one or more steps, processes, and/or functions as illustrated by one or more of blocks 502 through 508. Although the blocks are illustrated in a sequential order, a number of these blocks may also be performed simultaneously and/or in a different order than the one or more orders illustrated. Also, the various blocks may be combined into fewer blocks, divided into additional blocks, and/or removed based upon specific implementations.

At block 502, the method 500 includes determining a number of applications configured to communicate with a Bluetooth device. As shown in FIG. 4B, a number of applications 422, 424, and 426 may be determined to communicate with Bluetooth device 420. As noted for FIG. 4B, applications 422, 424, and 426 may be downloaded on Bluetooth device 420. Further, application manager 420 may determine applications 422, 424, and 426 are configured to communicate with application manager through application interfaces 428, 430, and 432, respectively.

At block 504, the method 500 further includes determining a number of virtual Bluetooth controller (VBC) interfaces for the number of applications, where the number of VBC interfaces correspond to respective Bluetooth static random (BSR) addresses of a number of BSR addresses. In some embodiments, each of the number VBC interfaces may correspond to a respective application of the number of applications.

For example, referring to FIG. 4B, a number of VBC interfaces (not shown in FIG. 4B) may be determined for at least one of the number of applications 422, 424, and 426, where the number of VBC interfaces correspond to respective BSR addresses of a number of BSR addresses, possibly including BSR address 410A. In some instances, each of the number of VBC interfaces may correspond to a respective application of the number of applications 422, 424, and 426.

At block 506, the method 500 further includes determining one or more advertising packets for the number of VBC interfaces, where the one or more advertising packets include the respective BSR addresses of the number of BSR addresses. As shown in FIG. 4B, one or more advertisement packets, e.g., advertising packet 436, may be determined for the number of VBC interfaces (not shown in FIG. 4B). In some instances, each of the one or more advertisement packets may include the respective addresses of the number of BSR addresses, possibly including BSR address 410A.

At block 508, the method 500 further includes transmitting, via a radio of the Bluetooth device, the one or more advertising packets for the number of VBC interfaces. As shown in FIG. 4B, radio 414 may transmit the one or more advertising packets, e.g., advertising packet 436, for the number of VBC interfaces (not shown in FIG. 4B).

As such, example methods herein allow for creating VBC interfaces for a number of applications 422, 424, and 426 of Bluetooth device 420. For example, by creating a VBC interface for each application 422, 424, and 426, an advertising packet may be transmitted for each application of the Bluetooth device 400 in accordance with Bluetooth protocols. As such, multiple advertising packets, including advertisement packet 436, may be transmitted for applications 422, 424, and 426 to pair Bluetooth device 400 with multiple other computing devices.

It should be noted that method 500 and other steps, processes, and/or functions disclosed herein show possible implementations of example embodiments. In this regard, each block in FIG. 5 may correspond to hardware, chipsets, and/or circuitry that are designed or wired to perform the specific logical functions in method 500. Further, each block in method 500 may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, As noted, method 500 and other steps, processes, and/or functions disclosed herein show possible implementations of example embodiments. Thus, the steps of method 500 are explained further in the following paragraphs. In particular, the steps of method 500 may be described in further detail in relation to FIG. 6A through 6C.

Figure 6A:
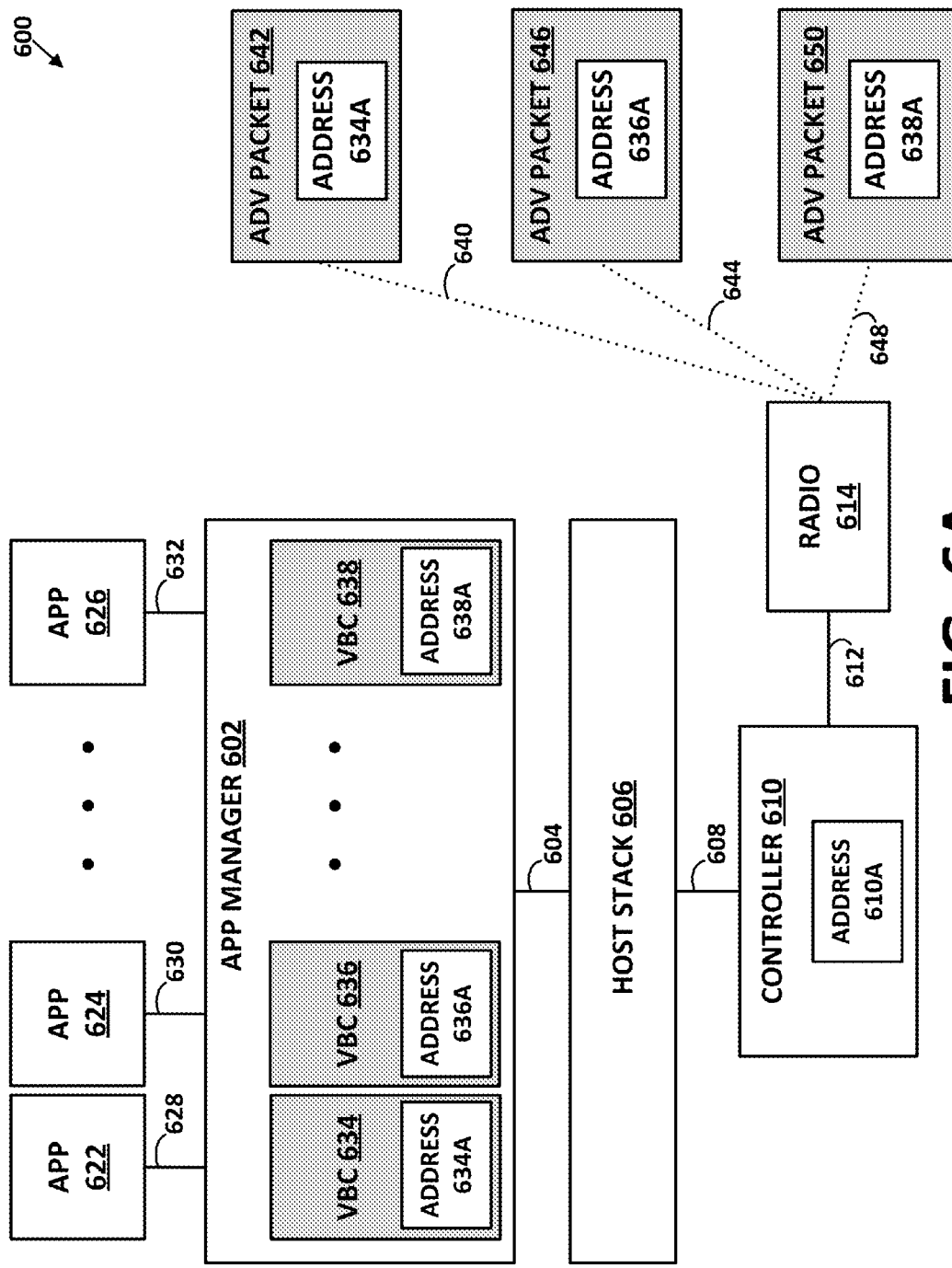
FIG. 6A illustrates a schematic drawing of yet another example Bluetooth device.

FIG. 6A illustrates a schematic drawing of yet another example Bluetooth device. In particular, Bluetooth device 600 may, for example, take the form of any of the computing devices, e.g., Bluetooth devices, described above in relation to FIGS. 1 through 5. For example, application manager 602, host stack 606, controller 610, and radio 614 may be similar or substantially similar to application manager 402, host stack 406, controller 410, and radio 414, respectively, in relation to FIGS. 4A and 4B. Further, application manager 602 may be coupled to host stack 606 by system bus 604 or a similar mechanism. Further, host stack 606 may be coupled to controller 610 by system bus 608 or a similar mechanism. Yet further, controller 610 may be coupled to radio by system bus 612 or similar mechanism.

Further, applications 622, 624, and 626 may, for example, take the forms of any of the applications described above in relation to FIGS. 1 through 5. For example, applications 622, 624, and 626 may be similar or substantially similar to applications 422, 424, and 426, respectively, in relation to FIGS. 4A and 4B. In some instances, a number of VBC interfaces 634, 636, and 638 may be created in application manager 602 for applications 622, 624, and 626, respectively. In addition, VBC interfaces 634, 636, and 638 may include BSR addresses 634A, 636A, and 638A, respectively.

In some embodiments, BSR addresses 610A, 634A, 636A, and 638A may take the form of any of the BSR addresses described above in relation to FIGS. 1 through 5. For example, BSR addresses 610A, 634A, 636A, and 638A may be 48-bit randomly generated addresses. Further, BSR addresses 610A, 634A, 636A, and 638A may meet the number of requirements described above such that the two most significant bits of the BSR addresses may be equal to '1', bits of the random part of the BSR address may or may not be equal to '1', and bits of the random part of the BSR address shall may or may not be equal to '0'.

In some embodiments, Bluetooth device 600 may create advertising packets 642, 646, and 650. Further, advertising packets 642, 646, and 650 may, for example, take the forms of any advertising packet described above in relation to FIGS. 1 through 5. Yet further, Bluetooth device 600 may enter advertisement mode to transmit one or more of advertising packets 642, 646, and 650 over the air in any manner described above in relation to FIGS. 1 through 5. Yet further, radio 614 may transmit advertising packets 642, 646, and 650 that include BSR addresses 634A, 636A, and 638A, respectively. In addition, advertising packets 642, 646, and 650 may be transmitted over channels 640, 644, and 648, respectively.

Referring back to block 502 of FIG. 5, a number of applications 622, 624, and 626 of FIG. 6A configured to communicate with Bluetooth device 600 may be determined. In particular, applications 622, 624, and 626 may be downloaded on Bluetooth device 600 and/or on a computing device combined with Bluetooth device 600. Further, applications 622, 624, and 626 may exchange advertisement data with application manager 602 through application interfaces 628, 630, and 632, respectively. Further, additional applications may attempt to exchange advertisement data with application manager 602, as illustrated by the ellipses between applications 624 and 626. Yet further, applications 622, 624, and 626 may communicate with application manager 602 to exchange advertising packets with other devices (not shown in FIG. 6).

In some embodiments, applications may request to advertise information. For example, at least one of applications 622, 624, and 626 may request to transmit advertising packets 642, 646, and 650, respectively. As such, at least one of applications 622, 624, and 626 may request a "BluetoothLeAdvertiser" instance object from Bluetooth device 600 through a Bluetooth application programming interface (API) of the operating system. In some instances, a BluetoothLeAdvertiser (herein referred to as the "BluetoothLeAdvertiser instance" for illustrative purposes) maybe an instance, object, and/or an instance object. Further, the BluetoothLeAdvertiser instance may be created from classes by subroutines, constructors, and/or other programming functions. As such, the BluetoothLeAdvertiser instance may handle one or more of the Bluetooth Low Energy advertisement functions for applications 622, 624, and 626.

In some embodiments, the number of applications requesting to advertise information may be compared with a number or a maximum number of VBC interfaces. For example, during initialization of host stack 606, the host stack 606 may query controller 610 for a number of VBC interfaces currently simulated by controller 610 or a maximum number of VBC interfaces that controller 610 may simulate, possibly for time-sharing radio 614 to transmit packets 642, 646, and 650. As such, host stack 606 may save this number as "max_advertiser". Further, Bluetooth device 600 may initialize a variable "advertiser_count" to compare with the max_advertiser. Yet further, the number of applications 622, 624, and 626 may be represented in advertiser_count and compared with max_advertiser. For example, applications 622, 624, and 626 may be represented as the three applications in the advertiser_count variable and this sum of three applications may be compared with 15 maximum applications represented in the max_advertiser variable. Since advertiser_count is less than max_advertiser, additional VBC interfaces may be created for advertising packets.

In some embodiments, one or more requests by the applications to transmit advertising packets may be granted. For example, Bluetooth device 600 may grant a request from at least one of applications 622, 624, and 626 to advertise information. Thus, Bluetooth device 600 may increment or add one to the advertiser_count. Further, in instances where advertiser_count is less than the max_advertiser, Bluetooth device 600 may continue granting additional requests from applications 622, 624, and 626, among other applications. In some instances, advertiser_count may reach the number represented as the max_advertiser. In such instances, Bluetooth device 600 may reject additional requests for BluetoothLeAdvertiser instances. Yet further, in some embodiments, a "BluetoothLeAdvertiser#close" call may reset or recycle the BluetoothLeAdvertiser and set the advertiser_count variable to zero.

FIG. 6B illustrates an example data table of VBC interfaces. In particular, data table 660 may, for example, be stored in any of the computing devices described above in relation to FIGS. 1 through 6A. Further, data table 660 may include data categories such as VBC data 662, BSR address data 664, advertising data 666, parameter data 668, and transmitting power 670 that may, for example, include data or representations of data described above in relation to FIGS. 1 through 6A.

In some instances, applications may initiate advertising functions. For example, a number of applications 622, 624, and 626 of FIG. 6A may call the "BluetoothLeAdvertiser#startAdvertise" instance and host stack 606 may send a command to controller 610. In some instances, this command may send data entries 672, 674, and 676 to controller 610. As such, controller 610 may maintain data table 660 including data category VBC data 662 that may also include VBC interface data 634, 636, and 638.

In particular, data entry 672 may include VBC interface data 634 and BSR address data 634A indicative of VBC interface 634 and BSR address 634A of FIG. 6A, respectively. Further, data entry 672 may include advertising data 678 for advertising application 622 to other computing devices. Yet further, data entry 672 may include advertising parameter data 684 and transmission power data 690 for transmitting advertising packet 642 of FIG. 6A.

Further, data entry 674 may include VBC interface data 636 and BSR address data 636A indicative of VBC interface 636 and BSR address 636A of FIG. 6A, respectively. Further, data entry 674 may include advertising data 680 for advertising application 624 to other computing devices. Yet further, data entry 674 may include advertising parameter data 686 and transmission power data 692 for transmitting advertising packet 646 of FIG. 6A.

Yet further, data entry 676 may include VBC interface data 638 and BSR address data 638A indicative of VBC interface 638 and BSR address 638A of FIG. 6A, respectively. Further, data entry 676 may include advertising data 682 for advertising application 626 to other computing devices. Yet further, data entry 676 may include advertising parameter data 688 and transmission power data 694 for transmitting advertising packet 650 of FIG. 6A.

Referring back to block 504 of FIG. 5, a number virtual Bluetooth controller (VBC) interfaces 634, 636, and 638 of FIG. 6A may be determined for the number of applications 622, 624, and 626, where the number of VBC interfaces 634, 636, and 638 correspond to respective Bluetooth static random (BSR) addresses of a number BSR addresses 634A, 636A, and 638A, respectively. Further, controller 610 may also include a physical Bluetooth controller (PBC) interface. In particular, the PBC interface corresponds to BSR address 610A that differs from addresses 634A, 636A, and 638A. Yet, method 500 may further include associating the PBC interface for one of applications 622, 624, and 626. In particular, an advertisement packet with BSR address 610 may be transmitted to advertise for any of the number applications 622, 624, and 626.

In some embodiments, a number VBC interfaces may be determined by the BluetoothLeAdvertiser instance. In particular, the BluetoothLeAdvertiser instance may determine or establish dedicated VBC interfaces 634, 636, and 638 for applications 622, 624, and 626, respectively. Further, each of VBC interfaces 634, 636, and 638 may be provided with a dedicated BSR addresses 634A, 636A, and 638A, respectively. In some instances, VBC interfaces 634, 636, and 638 may take the form of BluetoothLeAdvertiser Java instances.

In some embodiments, the number VBC interfaces may be determined by a number of applications. As noted, applications may request to advertise information, possibly to transmit advertising packets. For example, applications 622, 624, and 626 may request host stack 606 to create VBC interfaces for each application. In some instances, host stack 606 may grant a VBC interface to each of applications 622, 624, and 626 if VBC interfaces are available. In particular, VBC interfaces may be granted as long as advertiser_count is less than max_advertiser.

In some embodiments, a number VBC interfaces may be determined using a data table. Referring back to FIG. 6B, data table 660 may be used to determine VBC interface data 634, 636, and 638 for at least one of the number of applications 622, 624, and 626. In some instances, VBC interfaces 634, 636, and 638 may be determined for applications 622, 624, and 626, respectively. In particular, VBC interface data 634, 636, and 638 may be entered in table 660 for the applications 622, 624, and 626 of FIG. 6A, respectively. Further, BSR address data 634A, 636A, and 638A may be entered in table 660 for BSR addresses 634A, 636A, and 638A, respectively.

Referring back to block 506 of FIG. 5, one or more advertising packets 642, 646, and 650 of FIG. 6A may be determined for a number VBC interfaces 634, 636, and 638, respectively, where each of the one or more advertising packets 642, 646, and 650 include the respective BSR addresses of the number of BSR addresses 634A, 636A, and 638A.

In some embodiments, one or more advertising packets may be determined by at least one of a number of applications. Referring back to FIG. 6A, applications 622, 624, and 626 may request a BluetoothLeAdvertiser instance from Bluetooth device 600 to set up advertising packets 622, 624, and 626. Further, applications 622, 624, and 626 may set up advertising packets 642, 646, and 650, respectively, by calling a "BluetoothLeAdvertiser#setData" instance.

In particular, by calling the BluetoothLeAdvertiser#setData, each of advertising packets 642, 646, and 650 may, for example, be set up to take the form of advertising packet 440, among other packets described above in relation to FIGS. 1 through 5. Further, applications 622, 624, and 626 may call a BluetoothLeAdvertiser#startAdvertise instance after setting up the data, possibly to advertise or transmit advertising packets 642, 646, and 650 through radio 614.

In some embodiments, one or more advertising packets may be determined using a data table. For example, data table 660 of FIG. 6B may be used to determine one or more of advertising packets 642, 646, and 650 of FIG. 6A. As noted, the one or more of advertising packets 642, 646, and 650 may be determined for the number of VBC interfaces 634, 636, and 638, respectively. In addition, each of advertising packets 642, 646, and 650 may include BSR address data 634A, 636A, and 638A of FIG. 6B, respectively.

Referring back to block 508 of FIG. 5, one or more advertising packets 642, 646, and 650 of FIG. 6A may be transmitting for the number of VBC interfaces 634, 636, and 638, via radio 614 of the Bluetooth device 600. In particular, advertising packets 642, 646, and 650 may, for example, be transmitted in any manner described above in relation to FIGS. 1 through 6A. For example, advertising packets 642, 646, and 650 may be transmitted on channels 640, 644, and 648, respectively. In some instances, channels 640, 644, and 648 may be channels 37, 38, and 39 of a Bluetooth spectrum. Further, channels 640, 644, and 648 may correspond to 2.402 GHz, 2.426 GHz, and 2.480 GHz frequencies, respectively. Further, advertising packets 642, 646, and 650 may be transmitted including addresses 634A, 636A, and 650A, respectively.

In some embodiments, a data table may be used to transmit advertising packets. For example, data table 660 may be used to transmit advertising packets 642, 646, and 650. For example, data entries 672, 674, and 676 may be used to transmit advertising packets 642, 646, and 650, respectively. Advertising parameter data 684, 686, and 688 may each include data indicating an advertising interval, possibly determined by applications 622, 624, and 626, respectively. In particular, applications 622, 624, and 626 may set advertising time intervals for transmitting advertising data 678, 680, and 682, respectively. As such, each of the advertising packets 642, 646, and 650 may be transmitted during advertising time intervals, where each advertising time interval may vary from 100 milliseconds to 10.24 seconds, among other possible time intervals.

Further, advertising parameters 684, 686, and 688 may also each include data indicating an advertising time delay, possibly determined by applications 622, 624, and 626, respectively. In particular, applications 622, 624, and 626 may set advertising time delays before or after transmitting advertising time intervals for transmitting advertising data 678, 680, and 682, respectively. As such, each of the advertising packets 642, 646, and 650 may be transmitted before or after advertising time delays, where each advertising time delay may vary from 0 milliseconds to 10 milliseconds, among other possible advertising time delays. As such, advertising packets 642, 646, and 650 may be sent and received seamlessly by individual computing devices.

Further, controller 610 may use data table 660 to transmit advertising packets 642, 646, and 650 over the air using BSR addresses 634A, 636A, and 638A, respectively. In particular, controller 610 may use advertising data 678, 680, and 682 to transmit advertising packets 642, 646, and 650, respectively. Yet further, controller 610 may use parameter data 684, 686, and 688 to transmit advertising packets 642, 646, and 650, respectively. In addition, controller 610 may use transmission power data 690, 692, and 694 to transmit advertising packets 642, 646, and 650, respectively.

In some instances, a first advertising packet may be transmitted over a greater distance than a second advertising packet. For example, advertising packet 642 corresponding to VBC interface 634 may be transmitted over a first distance of 10 feet. Yet further, advertising packet 644 corresponding to VBC interface 636 may be transmitted over a second distance of 5 feet. In addition, for illustrative purposes, advertising packet 650 corresponding to VBC interface 638 may be transmitted over a third distance of 15 feet.

In some instances, a first advertising packet may be transmitted with a first duty cycle and a first transmitting power, where a second advertising packet may be transmitted with a second duty cycle and a second transmitting power. For example, advertising packet 642 corresponding to VBC interface 634 may be transmitted with a first duty cycle and a first transmitting power. Yet further, advertising packet 644 corresponding to VBC interface 636 may be transmitted with a second duty cycle and a second transmitting power, where the first power is greater than the second power.

It should be noted that data table 660 may include additional entries in addition to entries 672, 674, and 676. In some instances, data table 660 may have a maximum size, possibly limited by controller 610 and/or a memory size of controller 610. In some instances, data table 660 may be limited to nine entries or more.

Figure 6C:
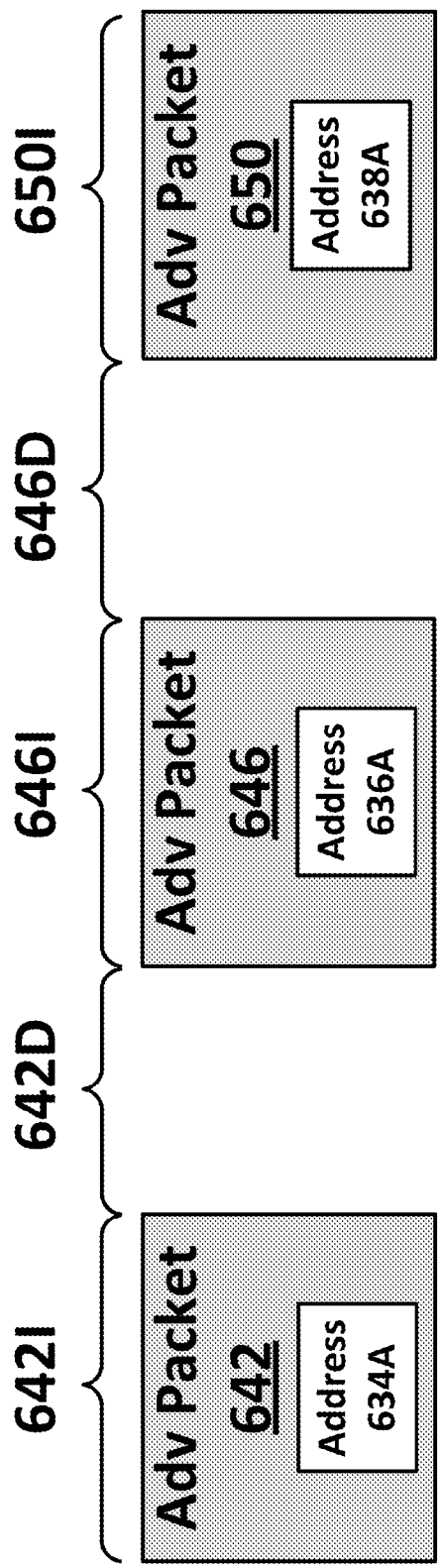
FIG. 6C illustrates example advertising packets.

FIG. 6C illustrates example advertising packets. In particular, advertising packets 642, 646, and 650 may, for example, be transmitted in any manner as described above in relation to FIGS. 1 through 6B. Further, packets 642, 646, and 650 of FIG. 6C may be similar, substantially, and/or the same a packets 642, 646, and 650 of FIG. 6A.

In some embodiments, applications may initiate the transfer of advertising packets. For example, applications 622, 624, and 626 may initiate the transmittal of advertising packets 642, 646, and 650, respectively. Further, advertising packets 642, 646, and 650 may be transmitted with addresses 634A, 636A, and 638A, respectively. Further, controller 610 may time-share radio 614 for transmitting advertising packets 642, 646, and 650 for applications 622, 624, and 626, respectively.

In some embodiments, parameters may be determined for transmitting advertising packets. As noted, parameters 684, 686, and 688 may be determined for transmitting advertising packets 642, 646, and 650, respectively. In some instances, parameters 684, 686, and 688 may be determined by applications 622, 624, and 626. In particular, applications 622, 624, and 626 may provide duty cycle and frequency for transmitting each of advertising packets 642, 646, and 650, respectively. Further, as noted, applications 622, 624, and 626 may provide transmitting power 690, 692, and 694, for transmitting advertising packets 642, 646, and 650, respectively.

As noted, Bluetooth device 600 may time-share radio 614 for transmitting advertising packets 642, 646, and 650 for applications 622, 624, and 626, respectively. As shown in FIG. 6C, advertising packet 642 may be transmitted by radio 614 during advertising time interval 642I. Further, after advertising time delay 642D, advertising packet 646 may be transmitted by radio 614 during advertising time interval 646I. Yet further, after advertising time delay 646D, advertising packet 650 may be transmitted by radio 614 during advertising time interval 650I.

In some embodiments, a listening device may receive one or more of advertising packets. For example, a listening device may receive one or more of advertising packets 642, 646, and 650 of FIG. 6A. In some instances, a listening device may send a request for more information or packets to radio 614. Thus, controller 610 may initiate a response to serve this request. Further, in some instances, the listening device may send a request to pair with Bluetooth device 600 using a number of VBC interfaces 634, 636, and 638. As such, controller 610 may transmit BSR address 610A assigned to controller 610 for pairing with the listening device.

In some embodiments, controller 610 may include an advertising queue for transmitting advertisement packets. In some instances, each of the entries 672, 674, and 676 of FIG. 6B may be sequentially and separately queued to the advertisement queue, possibly in the order shown in FIG. 6B (from top to bottom). For example, data entry 672 may be placed in the advertisement queue for the advertising time interval 642I indicated in advertising parameter data 684. Further, possibly after advertising time delay 642D, entry 674 may be placed in the advertisement queue for advertising time interval 646I. Yet further, possibly after advertising time delay 646D, entry 676 may be placed in the advertisement queue for advertising time interval 650I.

In some embodiments, controller 610 may include a transmitting queue for transmitting advertisement packets. As such, when data entry 672 is placed in advertisement queue, the transmitting queue may create and/or transmit advertising packet 642 during an advertising time interval 642I. Further, after advertising time delay 642D when data entry 674 is placed in the advertisement queue, the transmitting queue may create and/or transmit advertising packet 646 during advertising time interval 646I. Yet further, after advertising time delay 646D when data entry 676 is placed in the advertisement queue, the transmitting queue may create and/or transmit advertising packet 650 during advertising time interval 650I.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining a plurality of applications configured to communicate with a Bluetooth device;
   determining a plurality of virtual Bluetooth controller (VBC) interfaces for the plurality of applications, wherein the plurality of VBC interfaces correspond to respective Bluetooth static random (BSR) addresses of a plurality of BSR addresses, and wherein the plurality of VBC interfaces includes a first VBC interface corresponding to a first application and a second VBC interface corresponding to a second application of the plurality of applications;
   determining one or more advertising packets for the plurality of VBC interfaces, wherein the one or more advertising packets include the respective BSR addresses of the plurality of BSR addresses; and
   transmitting, via a radio associated with the Bluetooth device, the one or more advertising packets for the plurality of VBC interfaces, wherein transmitting the one or more advertising packets includes transmitting a first advertising packet corresponding to the first VBC interface at a first transmission power and transmitting a second advertising packet corresponding to the second VBC interface at a second transmission power.

2. The method of claim 1, wherein the Bluetooth device includes a physical Bluetooth controller (PBC) interface, wherein the PBC interface corresponds to a physical BSR address different from the respective BSR addresses for the plurality of VBC interfaces, and wherein the method further comprises associating the PBC interface for a particular one of the plurality of applications.

3. The method of claim 1, wherein the plurality of applications comprises a first application and a second application, and wherein determining the plurality of VBC interfaces for the plurality of applications comprises:
   determining a first VBC interface for the first application, wherein the first VBC interface corresponds to a first BSR address, and
   determining a second VBC interface for the second application, wherein the second VBC interface corresponds to a second BSR address, wherein the first BSR address differs from the second BSR address.

4. The method of claim 1, wherein the plurality of applications comprises: (i) a first application corresponding to a first VBC interface and (ii) a second application corresponding to a second VBC interface, wherein determining the one or more advertising packets for the plurality of applications comprises:
   determining a first advertising packet corresponding to the first VBC interface, wherein the first advertising packet comprises a first BSR address, and
   determining a second advertising packet corresponding to the second VBC interface, wherein the second advertising packet comprises a second BSR address.

5. The method of claim 4, wherein the method further comprises maintaining a data table comprising a first data entry indicative of the first VBC interface, the first advertising packet, and the first BSR address, and wherein the data table further comprises a second data entry indicative of the second VBC interface, the second advertising packet, and the second BSR address.

6. The method of claim 1, wherein the first advertising packet corresponding to the first VBC interface is transmitted with a first duty cycle and a first transmitting power, wherein the second advertising packet corresponding to the second VBC interface is transmitted with a second duty cycle and a second transmitting power, and wherein the first power is greater than the second transmitting power.

7. A Bluetooth device comprising;
   a processor; and
   a computer readable medium having stored thereon program instructions that when executed by the processor cause the Bluetooth device to perform functions, the functions comprising:
      determining a plurality of applications configured to communicate with the Bluetooth device;
      determining a plurality of virtual Bluetooth controller (VBC) interfaces for the plurality of applications, wherein the plurality of VBC interfaces correspond to respective Bluetooth static random (BSR) addresses of a plurality of BSR addresses, and wherein the plurality of VBC interfaces includes a first VBC interface corresponding to a first application and a second VBC interface corresponding to a second application of the plurality of applications;
      determining one or more advertising packets for the plurality of VBC interfaces, wherein the one or more advertising packets include the respective BSR addresses of the plurality of BSR addresses; and
      transmitting, via a radio associated with the Bluetooth device, the one or more advertising packets for the plurality of VBC interfaces, wherein transmitting the one or more advertising packets includes transmitting a first advertising packet corresponding to the first VBC interface at a first transmission power and transmitting a second advertising packet corresponding to the second VBC interface at a second transmission power.

8. The Bluetooth device of claim 7, wherein the Bluetooth device includes a physical Bluetooth controller (PBC) interface, wherein the PBC interface corresponds to a physical BSR address different from the respective BSR addresses for the plurality of VBC interfaces, and wherein the functions further comprise associating the PBC interface for a particular one of the plurality of applications.

9. The Bluetooth device of claim 7, wherein the plurality of applications comprises a first application and a second application, and wherein determining the plurality of VBC interfaces for the plurality of applications comprises:
   determining a first VBC interface for the first application, wherein the first VBC interface corresponds to a first BSR address, and
   determining a second VBC interface for the second application, wherein the second VBC interface corresponds to a second BSR address, wherein the first BSR address differs from the second BSR address.

10. The Bluetooth device of claim 7, wherein the plurality of applications comprises: (i) a first application corresponding to a first VBC interface and (ii) a second application corresponding to a second VBC interface, wherein determining the one or more advertising packets for the plurality of applications comprises:

determining a first advertising packet corresponding to the first VBC interface, wherein the first advertising packet comprises a first BSR address, and determining a second advertising packet corresponding to the second VBC interface, wherein the second advertising packet comprises a second BSR address.

11. The Bluetooth device of claim 10, wherein the functions further comprise maintaining a data table comprising a first data entry indicative of the first VBC interface, the first advertising packet, and the first BSR address, and wherein the data table further comprises a second data entry indicative of the second VBC interface, the second advertising packet, and the second BSR address.

12. The Bluetooth device of claim 7, wherein the first advertising packet corresponding to the first VBC interface is transmitted with a first duty cycle and a first transmitting power, wherein the second advertising packet corresponding to the second VBC interface is transmitted with a second duty cycle and a second transmitting power, and wherein the first power is greater than the second transmitting power.

13. A non-transitory computer-readable medium having stored thereon program instructions that, when executed by a processor of a Bluetooth device, cause the Bluetooth device to perform functions comprising:

determining a plurality of applications configured to communicate with the Bluetooth device;

determining a plurality of virtual Bluetooth controller (VBC) interfaces for the plurality of applications, wherein the plurality of VBC interfaces correspond to respective Bluetooth static random (BSR) addresses of a plurality of BSR addresses, and wherein the plurality of VBC interfaces includes a first VBC interface corresponding to a first application and a second VBC interface corresponding to a second application of the plurality of applications;

determining one or more advertising packets for the plurality of VBC interfaces, wherein the one or more advertising packets include the respective BSR addresses of the plurality of BSR addresses; and transmitting, via a radio associated with the Bluetooth device, the one or more advertising packets for the plurality of VBC interfaces, wherein transmitting the one or more advertising packets includes transmitting a first advertising packet corresponding to the first VBC interface at a first transmission power and transmitting a second advertising packet corresponding to the second VBC interface at a second transmission power.

14. The non-transitory computer-readable medium of claim 13, wherein the Bluetooth device includes a physical Bluetooth controller (PBC) interface, wherein the PBC interface corresponds to a physical BSR address different from the respective BSR addresses for plurality of VBC interfaces, and wherein the functions further comprise associating the PBC interface for a particular one of the plurality of applications.

15. The non-transitory computer-readable medium of claim 13, wherein the plurality of applications comprises a first application and a second application, and wherein determining the plurality of VBC interfaces for the plurality of applications comprises:

determining a first VBC interface for the first application, wherein the first VBC interface corresponds to a first BSR address, and determining a second VBC interface for the second application, wherein the second VBC interface corresponds to a second BSR address, wherein the first BSR address differs from the second BSR address.

16. The non-transitory computer-readable medium of claim 13, wherein the plurality of applications comprises: (i) a first application corresponding to a first VBC interface and (ii) a second application corresponding to a second VBC interface, wherein determining the one or more advertising packets for the plurality of applications comprises:

determining a first advertising packet corresponding to the first VBC interface, wherein the first advertising packet comprises a first BSR address, and determining a second advertising packet corresponding to the second VBC interface, wherein the second advertising packet comprises a second BSR address.

17. The non-transitory computer-readable medium of claim 16, wherein the functions further comprises maintaining a data table comprising a first data entry indicative of the first VBC interface, the first advertising packet, and the first BSR address, and wherein the data table further comprises a second data entry indicative of the second VBC interface, the second advertising packet, and the second BSR address.

\* \* \* \* \*